(12) United States Patent
Auer et al.

(10) Patent No.: US 8,776,926 B2
(45) Date of Patent: Jul. 15, 2014

(54) FASTENING DEVICE

(75) Inventors: Thomas Auer, Metnitz (AT); Martin Rodler, Krottendorfer (AT)

(73) Assignee: Magna Steyr Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 13/639,517

(22) PCT Filed: Apr. 8, 2011

(86) PCT No.: PCT/EP2011/055546
§ 371 (c)(1),
(2), (4) Date: Oct. 5, 2012

(87) PCT Pub. No.: WO2011/124701
PCT Pub. Date: Oct. 13, 2011

(65) Prior Publication Data
US 2013/0020140 A1   Jan. 24, 2013

Related U.S. Application Data

(60) Provisional application No. 61/321,936, filed on Apr. 8, 2010, provisional application No. 61/322,289, filed on Apr. 9, 2010.

(51) Int. Cl.
*B60R 16/04* (2006.01)
(52) U.S. Cl.
USPC ........................................ 180/68.5

(58) Field of Classification Search
USPC .......................................... 903/907; 180/68.5
See application file for complete search history.

(56) References Cited

U.S. PATENT DOCUMENTS

| | | | | |
|---|---|---|---|---|
| 5,490,572 A * | 2/1996 | Tajiri et al. | ................... | 180/65.1 |
| 5,728,488 A * | 3/1998 | Kranz et al. | ................... | 429/120 |
| 6,085,854 A * | 7/2000 | Nishikawa | .................... | 180/68.5 |
| 6,483,719 B1 * | 11/2002 | Bachman | ..................... | 361/816 |
| 7,997,368 B2 * | 8/2011 | Takasaki et al. | ............. | 180/68.5 |
| 8,006,793 B2 * | 8/2011 | Heichal et al. | ............... | 180/68.5 |

* cited by examiner

*Primary Examiner* — John Walters
*Assistant Examiner* — James Triggs
(74) *Attorney, Agent, or Firm* — Jordan IP Law, LLC; Todd A. Vaughn (57) ABSTRACT

A fixing device for releasable fixing an electrical energy accumulator to a carrying structure of a motor vehicle includes at least one insertion bolt and a receiver unit for the insertion bolt which are provided on the carrying structure and on the energy accumulator (or vice versa). The insertion bolt includes a retaining protrusion and the receiver unit includes a cage and a locking element mounted in the cage. The cage includes an insertion opening into which the insertion bolt can be introduced along an insertion direction, and the locking element can be moved between a release position and a locked position. In the release position, the locking element opens the insertion opening for introduction of the insertion bolt and in the locked position engages behind the retaining protrusion of the insertion bolt when the insertion bolt is introduced in the insertion opening of the cage.

19 Claims, 10 Drawing Sheets

FASTENING DEVICE

CROSS-REFERENCE TO RELATED APPLICATIONS

The present application is a National Stage Application of PCT International Application No. PCT/EP2011/055546 (filed on Apr. 8, 2011), under 35 U.S.C. §371, which claims priority to U.S. Provisional Patent Application No. 61/322,289 (filed on Apr. 9, 2010) and U.S. Provisional Patent Application No. 61/321,936 (filed on Apr. 8, 2010), which are each hereby incorporated by reference in their respective entireties.

FIELD OF THE INVENTION

The present invention concerns a fastening device for releasable fastening/fixing an electrical energy accumulator to a carrying structure of a motor vehicle, in particular an electric vehicle or a hybrid vehicle.

BACKGROUND OF THE INVENTION

Electric or hybrid vehicles have an electric drive motor which transmits a torque to the vehicle wheels. The energy to operate the electric drive motor is taken from the energy accumulator, which in particular can be a rechargeable battery, i.e., an accumulator. Usually such a battery has an array of galvanic cells accommodated in a housing. The battery can for example be bolted to the chassis of the motor vehicle.

When a battery change is required on the vehicle, the bolted connection between the battery and the vehicle must be released and after removal of the old battery, a replacement battery bolted in. Because of wear on the thread, the reliability of the bolted connection can deteriorate, in particular on frequent replacement procedures. Furthermore a bolted connection with a safety-critical character requires a relatively high installation complexity e.g. in the form of particularly detailed documentation.

SUMMARY OF THE INVENTION

The object of the invention is therefore to make the releasable fixing of an energy accumulator to the chassis of a motor vehicle simpler and safer.

The object is achieved by a fixing device for releasable fixing of an electrical energy accumulator to a carrying structure of a motor vehicle, in particular a hybrid vehicle or electric vehicle, with at least one insertion bolt and a receiver unit for the insertion bolt which are provided on the carrying structure and on the energy accumulator or vice versa, wherein the insertion bolt comprises a retaining protrusion, wherein the receiver unit comprises a cage and a locking element mounted in the cage, wherein the cage comprises an insertion opening into which the insertion bolt can be introduced along an insertion direction, and wherein the locking element can be moved between a release position and a locked position, wherein in the release position the locking element opens the insertion opening for introduction of the insertion bolt and in the locked position engages behind the retaining protrusion of the insertion bolt when the insertion bolt is introduced into the insertion opening of the cage.

In accordance with embodiments of the invention, a fixing device comprises at least one insertion bolt and a receiver unit for the insertion bolt which are provided on the carrying structure and on the energy accumulator or vice versa, wherein the insertion bolt comprises a retaining protrusion, wherein the receiver unit comprises a cage and a locking element mounted in the cage, wherein the cage comprises an insertion opening into which the insertion bolt can be introduced along an insertion direction, and wherein the locking element can be moved between a release position and a locked position, wherein in the release position the locking element opens the insertion opening for insertion of the insertion bolt, and in the locked position engages behind the retaining protrusion of the insertion bolt when the insertion bolt is introduced into the insertion opening of the cage.

The insertion bolt can be attached to the carrying structure as a separate component or molded directly thereon. The receiver unit is preferably attached to a housing of the energy accumulator. It is also possible for the receiver unit to be attached to the carrying structure and the insertion bolt be attached to or molded on the housing of the energy accumulator. When the locking element is in the release position, the energy accumulator can be brought up to the vehicle and by introduction of the insertion bolt into the insertion opening of the cage, arranged in the correct position on the carrying structure. A reliable form-fit connection is created by subsequent movement of the locking element into the locked position because of the engagement of the retaining protrusion of the insertion bolt. To change the energy accumulator, the locking element need merely be moved into the release position so that the insertion bolt can be extracted from the receiver unit again.

To attach an energy accumulator to the vehicle therefore only one insertion process and one movement of the locking element are required, leading to simple and rapid installation. In particular a battery change can also be performed by untrained personnel. Because of the form-fit engagement between the insertion bolt and the receiver unit however a high degree of safety is guaranteed. No thread wear occurs so that more frequent changing of the energy accumulator is possible without problems.

Refinements of the invention are described in the secondary claims, the description and the attached drawings.

In accordance with an embodiment of the invention, the insertion bolt comprises at least one centering surface which is oriented obliquely to the insertion direction of the insertion bolt, wherein the cage of the receiver unit comprises at least one stop surface which is oriented obliquely to the insertion direction of the insertion bolt, wherein the centering surface of the insertion bolt and the stop surface of the cage cooperate on introduction of the insertion bolt into the insertion opening such that the insertion bolt and the cage are centered relative to each other in at least one direction perpendicular to the insertion direction. The centering surface and the stop surface thus serve as centering aids. In particular, before introduction of the insertion bolt, no complex precise positioning of the energy accumulator relative to the carrying structure is required.

In accordance with an embodiment of the invention, the centering surface of the insertion bolt is conical. The insertion bolt can thus be centered in various directions.

The stop surface of the cage can be conical or planar or the cage can comprise two planar stop surfaces tilted relative to each other. In particular, the centering surface of the insertion bolt can be conical and the stop surface of the cage can also be conical. In this case, centering is possible in any arbitrary direction perpendicular to the insertion direction. Preferably, in such an embodiment the cone surfaces are formed similarly so that after introduction of the insertion bolt into the receiver unit, a large stop surface results with high strength. On a design with two planar stop surfaces, in one direction there is a degree of freedom of movement between the insertion bolt and the receiver unit which helps to compensate for tolerances.

An elastically deformable damping element can be provided on the centering surface of the insertion bolt or on the stop surface of the cage. Such a damping element can reduce or prevent undesirable noise and vibrations.

The insertion opening of the cage can be a slot. A slot is particularly useful as an insertion opening if two planar stop surfaces, tilted relative to each other, are provided on the cage, wherein the longitudinal direction of the slot runs parallel to the two planar stop surfaces. The degree of freedom of movement is then retained as the insertion bolt can move in the slot in the corresponding longitudinal direction of the slot.

The locking element preferably defines a passage opening with variable width. By moving the locking element in the cage, the width of the passage opening can be reduced whereby the edging of the passage opening comes ever closer to the bolt and finally engages behind its retaining protrusion. I.e. the edging of the passage opening defines a blocking surface which, on movement of the locking element, comes into a form-fit engagement with the retaining protrusion.

The locking element can be twisted between the release position and the locked position about a rotation axis. This leads to a particularly simple activation of the locking element to fix or release the connection. In accordance with one embodiment of the invention, the blocking surface of the locking element forms a curved track, in particular two curved tracks concentric in segments. Alternatively, the locking element can also move in a straight line.

In accordance with a further refinement of the invention, the locking element is mounted in the cage with play such that the locking element is mobile in two dimensions relative to the cage in a plane running transverse to the insertion direction of the insertion bolt. Such a mounting can be used to compensate for tolerances. The abovementioned rotation axis of a twistable locking element is thus also shifted two-dimensionally.

The locking element can furthermore comprise a blocking surface which engages behind the retaining protrusion of the insertion bolt when the insertion bolt is introduced into the insertion opening of the cage and the locking element is moved into the locked position, wherein the blocking surface of the locking element is tilted at least in segments in relation to a plane normal to the insertion direction. The blocking surface can for example be the edging of said passage opening. The tilt ensures that the insertion bolt, on movement of the locking element from the release position into the locked position, is tensioned against said stop surface of the receiver unit, preferably in a self-inhibiting manner. Activation of the locking element thus causes not only a locking of the energy accumulator on the carrying structure but also security against undesirable wobbling.

The receiver unit can comprise a securing device by means of which the locking element can be secured in the release position and/or in the locked position, in particular by a respective catch closure. Such a securing device can offer protection against accidental release of the fixing device.

Furthermore, the free end of the insertion bolt can comprise an in particular conical insertion chamfer. Such an insertion chamfer can be an additional mounting aid. In particular by means of the insertion chamfer, rough pre-positioning can be carried out before the actual centering process using the centering surface and the stop surface.

The invention furthermore concerns a fixing system with several, preferably two, three or four fixing devices of said type, wherein the fixing devices are preferably provided for different corner regions of the energy accumulator. An energy accumulator can thus be held securely on the vehicle by the fixing devices alone. Preferably the energy accumulator is attached to the vehicle from below. To this end a cavity can be provided on the underside of the vehicle to receive the energy accumulator.

In accordance with one embodiment of such a fixing system, the cage of the receiver unit of a first of the several fixing devices comprises a conical stop surface which cooperates with the conical centering surface of the insertion bolt of the first fixing device such that the insertion bolt and the cage are centered relative to each other in two mutually perpendicular directions within a plane normal to the insertion direction. The cage of the receiver unit of a second of the several fixing devices comprises at least one planar stop surface which is oriented obliquely to the insertion direction of the insertion bolt of the second fixing device and which cooperates with a conical centering surface or at least one planar centering surface of the insertion bolt such that the insertion bolt and the cage are centered relative to each other in a first direction perpendicular to the insertion direction. The first fixing device thus achieves a complete centering of the energy accumulator and the carrying structure in the normal plane, whereas in the second fixing device there is a degree of freedom in a direction transverse to the insertion direction, which allows compensation for tolerance-induced mis-positioning.

In accordance with a refinement of this embodiment, the cage of the receiver unit of a third of the several fixing devices comprises at least one planar stop surface which is oriented obliquely to the insertion direction of the insertion bolt of the third fixing device and which cooperates with a conical centering surface or at least one planar centering surface of the insertion bolt such that the insertion bolt and the cage are centered relative to each other in a second direction perpendicular to the insertion direction, wherein the second direction is perpendicular to the first direction. Whereas the energy accumulator in this embodiment is again held in all spatial directions on the first fixing device, with the second and third fixing devices there are degrees of freedom which allow compensation for tolerances. As the first direction and second direction run perpendicular to each other, the position of the energy accumulator is however fully defined after fixing.

At least one of the several fixing devices can comprise a receiver unit for an insertion bolt on which no obliquely oriented stop surface is provided for the insertion bolt. In this way over-determination can be avoided.

In accordance with an alternative embodiment of said fixing system, the cage of the receiver unit of a first of the several fixing devices is formed without an obliquely oriented stop surface for the insertion bolt and the cage of the receiver unit of a second of the several fixing devices comprises at least one planar stop surface which is oriented obliquely to the insertion direction of the insertion bolt of the second fixing device and which cooperates with a conical centering surface or at least one planar centering surface of the insertion bolt such that the insertion bolt and the cage are centered relative to each other in a first direction perpendicular to the insertion direction. This embodiment allows a greater tolerance with regard to orientation of the energy accumulator relative to the carrying structure.

Furthermore, the cage of the receiver unit of a third of the several fixing devices can comprise at least one planar stop surface which is oriented obliquely to the insertion direction of the insertion bolt of the third fixing device and which cooperates with a conical centering surface or at least one planar centering surface of the insertion bolt such that the insertion bolt and the cage are centered relative to each other in a second direction perpendicular to the insertion direction, wherein the second direction is perpendicular to the first direction. The precise orientation of the energy accumulator relative to the carrying structure in this embodiment is thus achieved exclusively via the planar chamfer surfaces oriented perpendicular to each other of the first and the second fixing device.

Preferably two receiver units with planar stop surfaces are provided which are active perpendicular to each other.

The invention also relates to an energy accumulator system for a motor vehicle with at least one electrical energy accumulator and with several fixing devices of said type for fixing the energy accumulator releasably to a carrying structure of the motor vehicle.

BRIEF DESCRIPTION OF THE DRAWINGS

The invention is now described below as an example with reference to the drawings, in which.

DETAILED DESCRIPTION OF EMBODIMENTS

Figure 1:
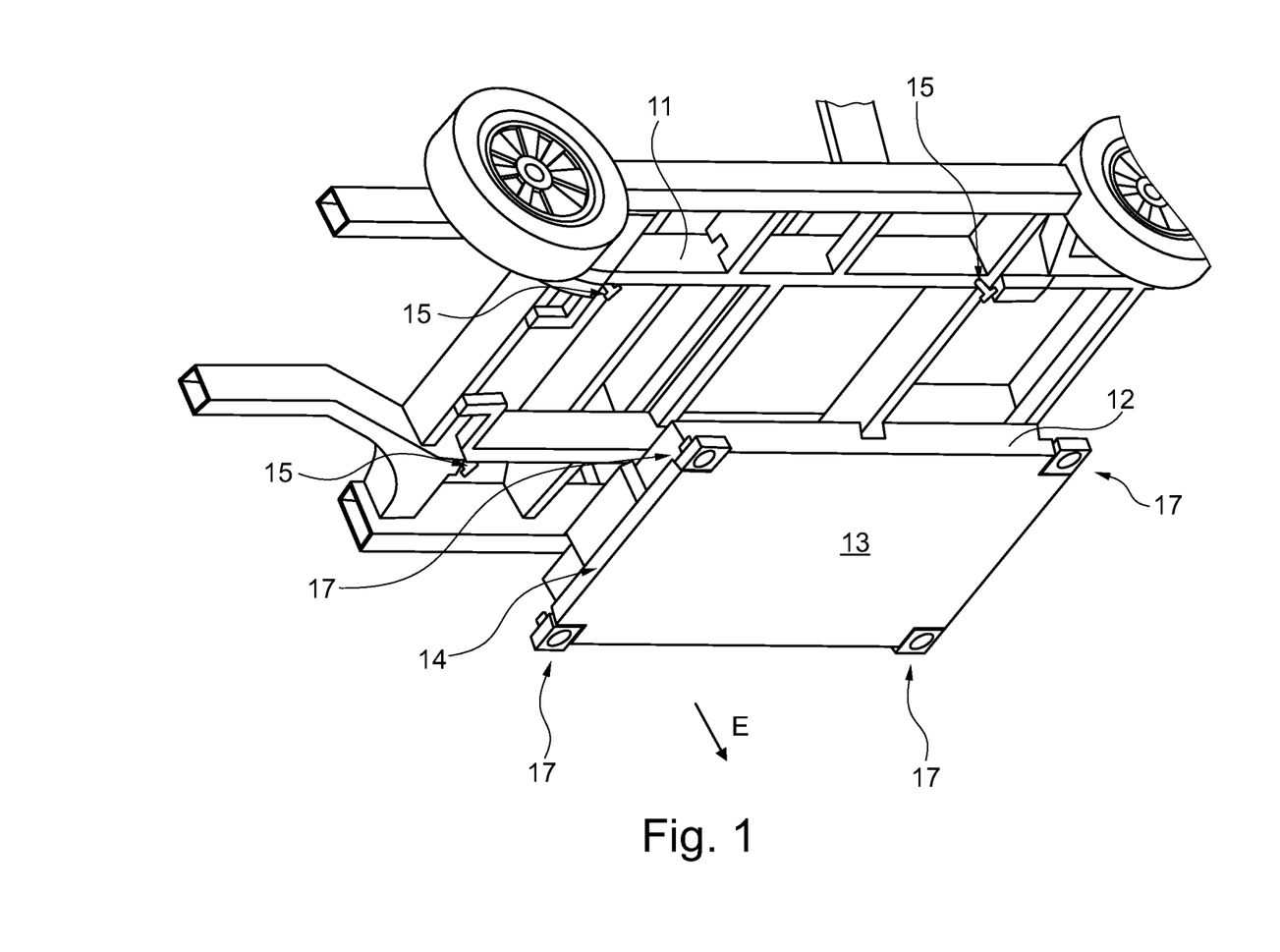
FIG. 1 illustrates a motor vehicle with a carrying structure and an energy accumulator to be fixed to the carrying structure by means of a fixing system in accordance with embodiments of the invention.
Figure 2:
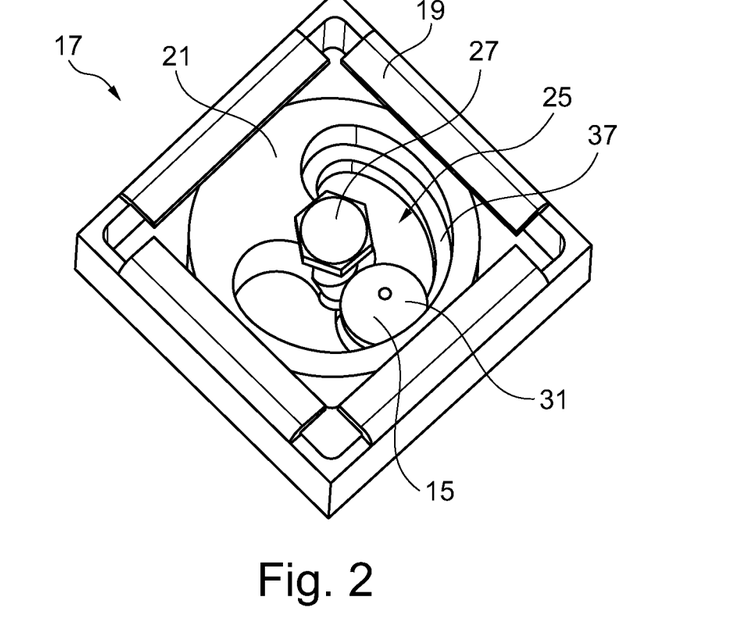
FIG. 2 illustrates a perspective view of a fixing device in accordance with embodiments of the invention.
Figure 3:
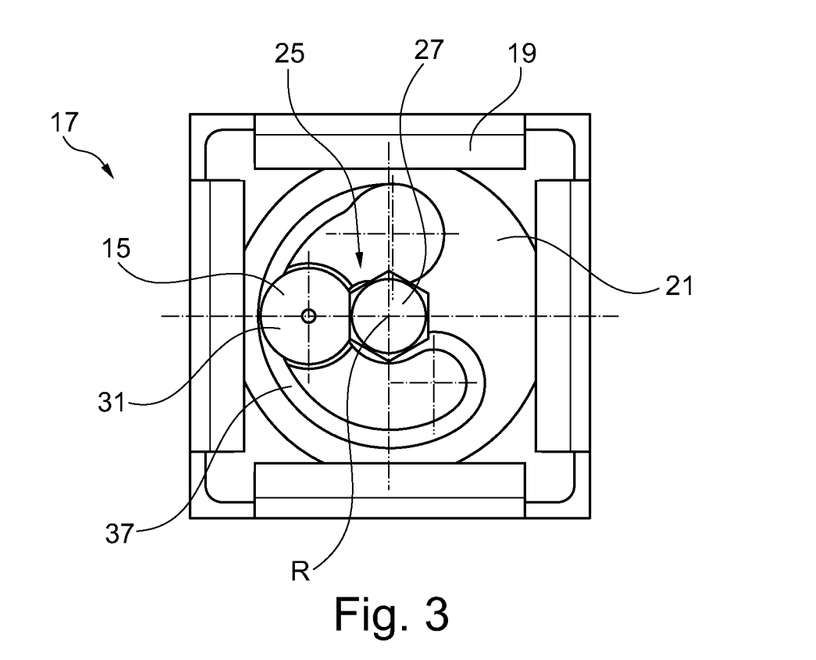
FIG. 3 illustrates a top view of the fixing device in FIG. 2.

FIG. 1 illustrates in simplified form parts of an electric vehicle with a carrying frame 11, on the underside of which an energy accumulator 13, e.g., a rechargeable battery can be fastened or otherwise fixed releasably. Fixing takes place by means of four fixing devices which each comprise an insertion bolt 15 attached to the supporting frame 11 and a receiver unit 17 provided on the energy accumulator 13 for receiving the insertion bolt 15. As illustrated in FIG. 1, the energy accumulator 13 has a substantially cubic housing 12 with a peripheral protrusion 14, wherein the receiver units 17 are provided at the respective corner regions of the peripheral protrusion 14. The four insertion bolts 15 are arranged on the carrying frame 11 such that they can be introduced simultaneously into the receiver units 17 along an insertion direction E when the energy accumulator 13 is brought up to the carrying frame 11.

The fixing devices are fitted with a mechanism for releasable locking of the energy accumulator 13 to the carrying frame 11, as will be explained below with reference to FIGS. 2 to 5. Each of the receiver units 17 comprises a cage 19 and a locking element 21 held therein. The locking element 21 is shaped as a disk and therefore mounted mobile in the cage 19 such that it is rotatable about a rotation axis R and at the same time displaceable by a predetermined amount in a plane perpendicular to rotation axis R. The cage 19 in accordance with FIGS. 4 and 5 defines an insertion opening 23 for introduction of an insertion bolt 15. A conical stop surface 29 extends around the insertion opening 23. The locking element 21 has a centrally located activation segment 27 with a hexagonal-shaped head and defines a curved passage opening 25 running in segments concentric to rotation axis R and having a variable width.

Figure 4:
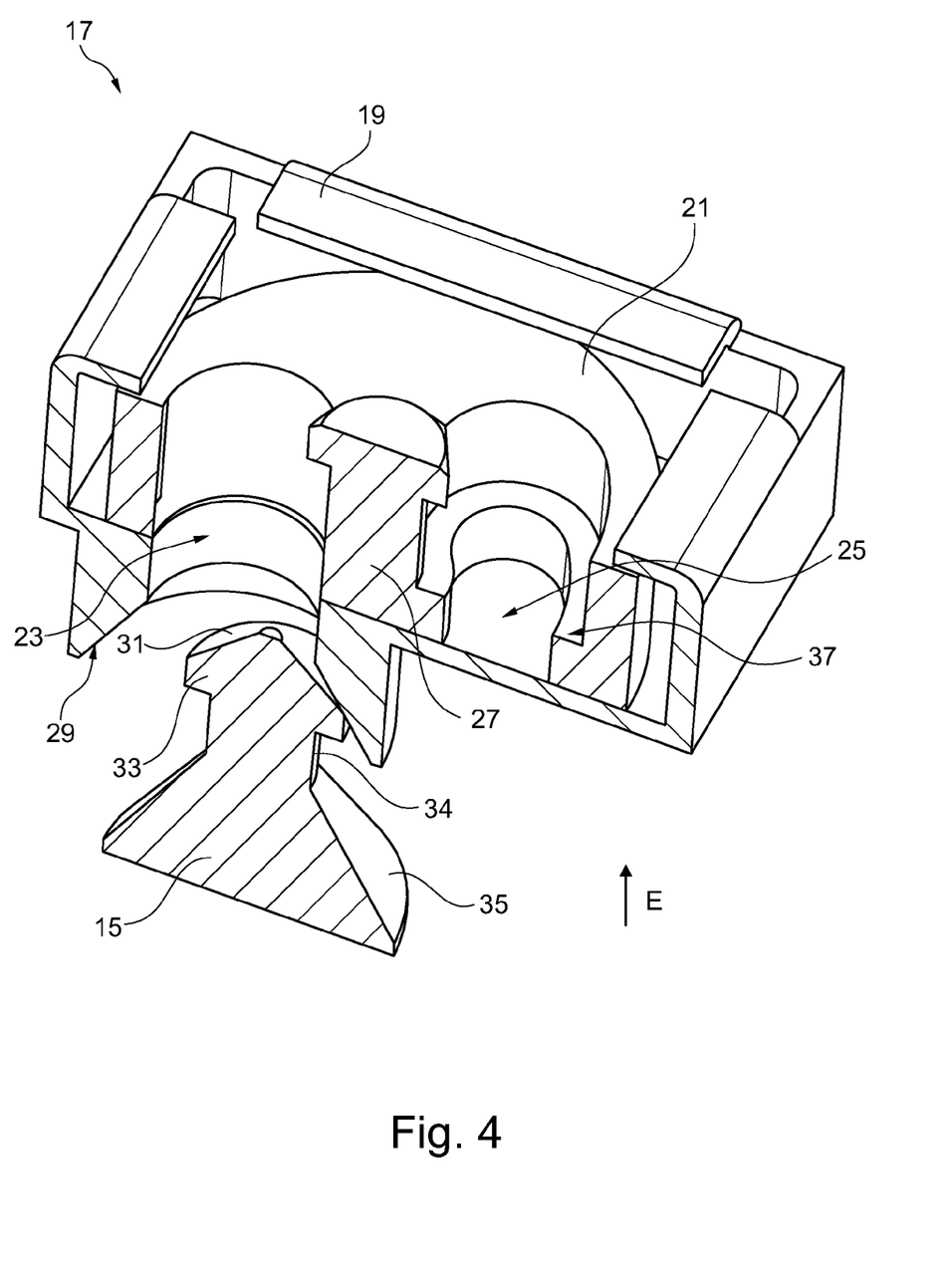
FIG. 4 illustrates a perspective, partly cut-away depiction of the fixing device in FIG. 2.
Figure 5:
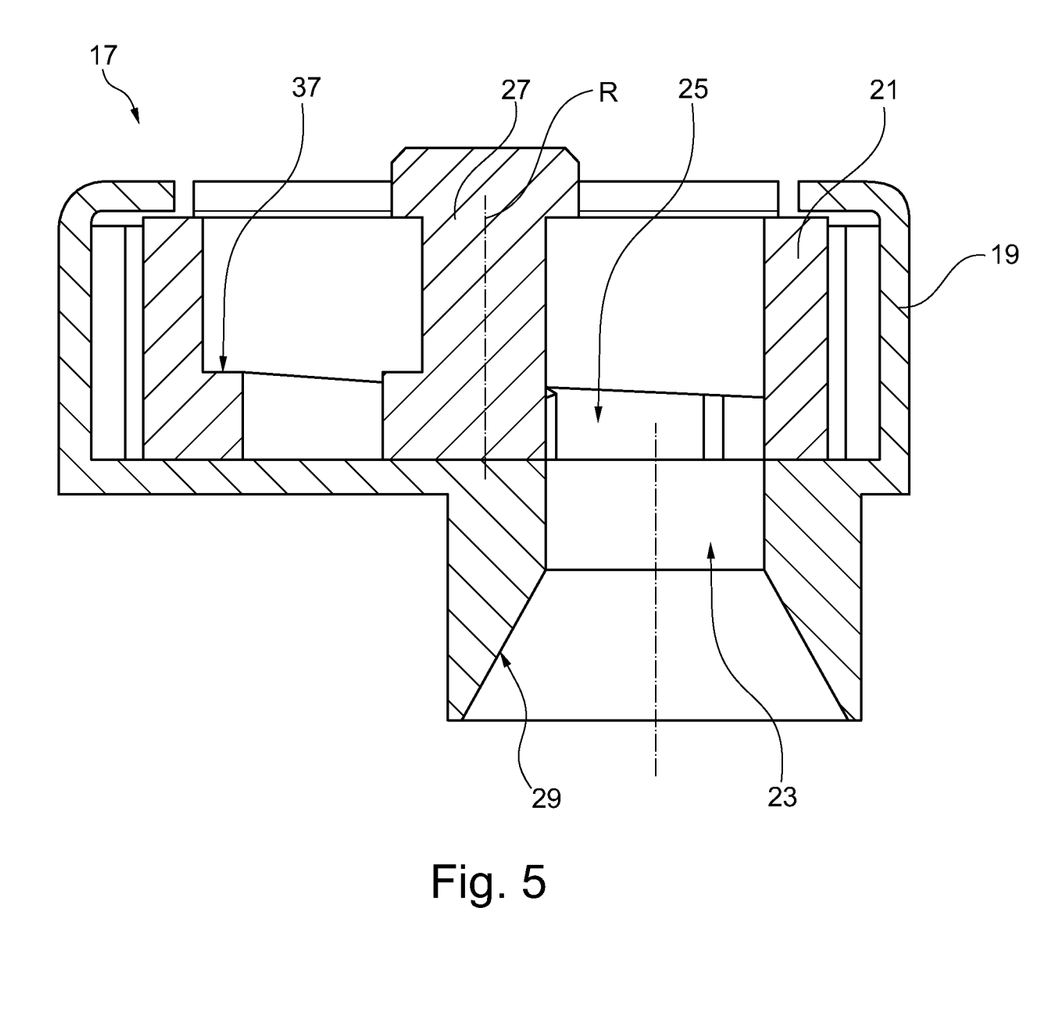
FIG. 5 illustrates a side section view of the fixing device in FIG. 2.

The insertion bolt 15 at its free end has a conical insertion chamfer 31 which transforms into a retaining protrusion 33. In the cylindrical segment 34 following the insertion chamfer 31 and the retaining protrusion 33 against the insertion direction E is provided a conical centering surface 35, the form of which corresponds to the conical stop surface 29 of the cage 19.

As illustrated in FIG. 5, a blocking surface 37 of the locking element 21 formed by the edging of the passage opening 25 is tilted in relation to a normal plane to the insertion direction E, i.e., the blocking surface 37 forms a ramp.

By turning the activation segment 27, the locking element 21 can be moved between a release position illustrated in FIG. 4 and a locked position. When the locking element 21 is in the release position, the insertion opening 23 of the cage 19 aligns with the wider part of the passage opening 25 of the locking element 21 so that the insertion bolt 15 can be introduced into the insertion opening 23. When the insertion bolt 15 is in the receiver unit 17 and the locking element 21 is moved from the release position to the locked position, the insertion opening 23 of the cage 19 in contrast aligns with the narrower part of the passage opening 25 so that the blocking surface 37 can engage behind the retaining protrusion 33 of the insertion bolt 15.

Figure 6:
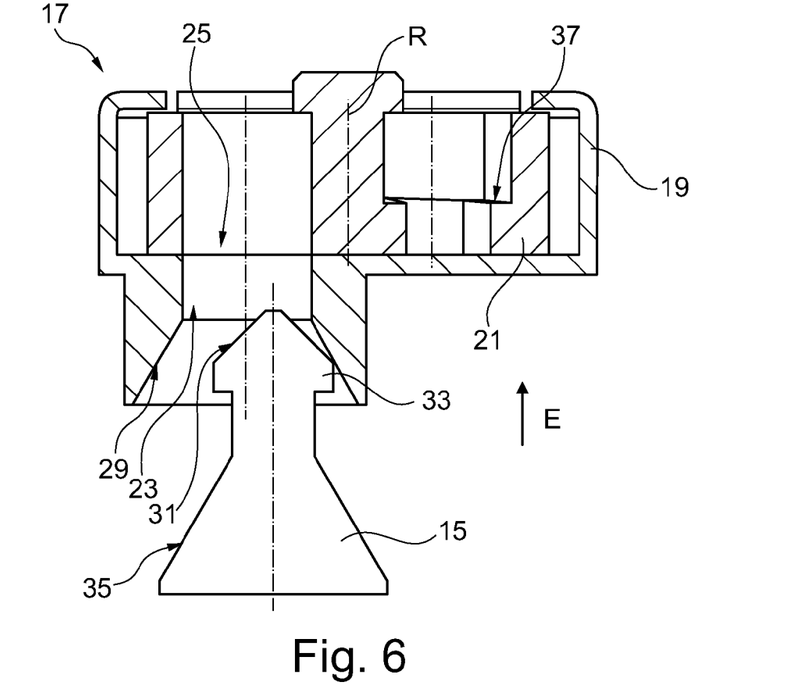
FIG. 6 illustrates an insertion bolt of the fixing device of FIG. 2 in a first phase of introduction into an associated receiver unit.

The fixing process is now explained in more detail below with reference to FIGS. 6 to 9. First, the energy accumulator 13 is roughly prepositioned and brought up to the carrying frame 11 in order to introduce the insertion bolt 15 along insertion direction E into the receiver units 17. Insofar as one of the insertion bolts 15 and associated receiver unit 17 are not precisely centered, the insertion chamfer 31 of the insertion bolt 15, as illustrated in FIG. 6, comes into contact with the conical stop surface 29 of the cage 19 and causes a correcting orientation of the energy accumulator 13 relative to the carrying frame 11 so that the insertion bolt 15 can be passed through the insertion opening 23 of the cage 19.

Figure 7:
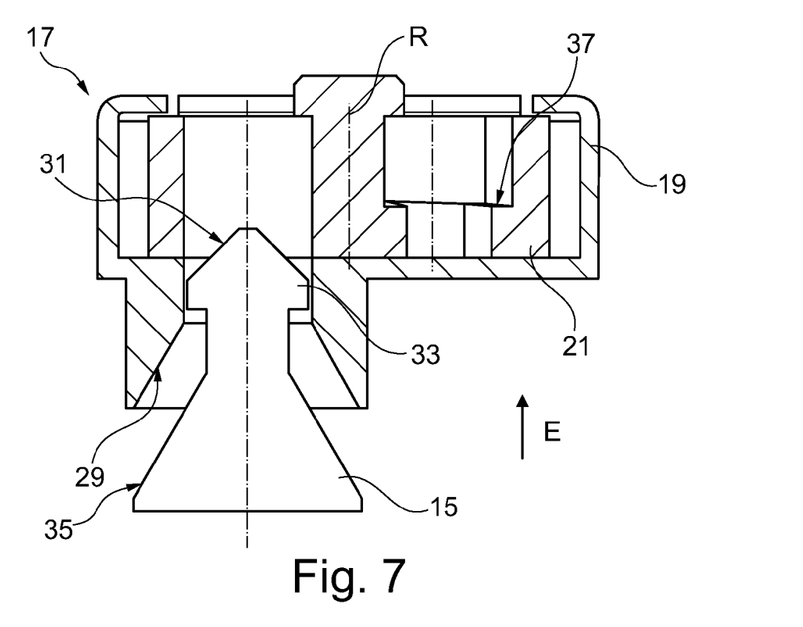
FIG. 7 illustrates the insertion bolt of FIG. 6 in a second phase of introduction.
Figure 8:
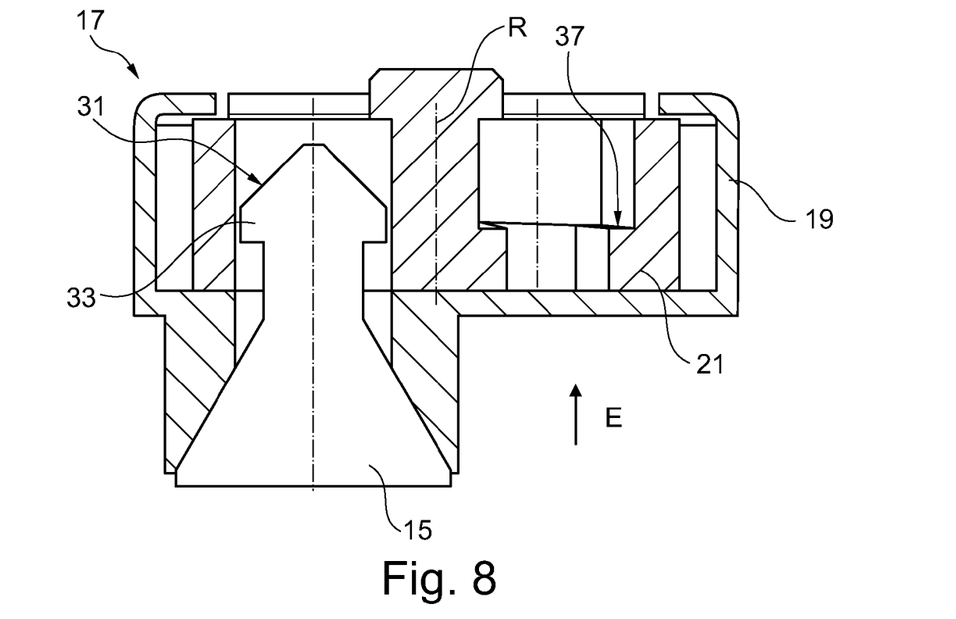
FIG. 8 illustrates the insertion bolt in fully introduced state, wherein a locking element for the receiver unit is in a release position.
Figure 9:
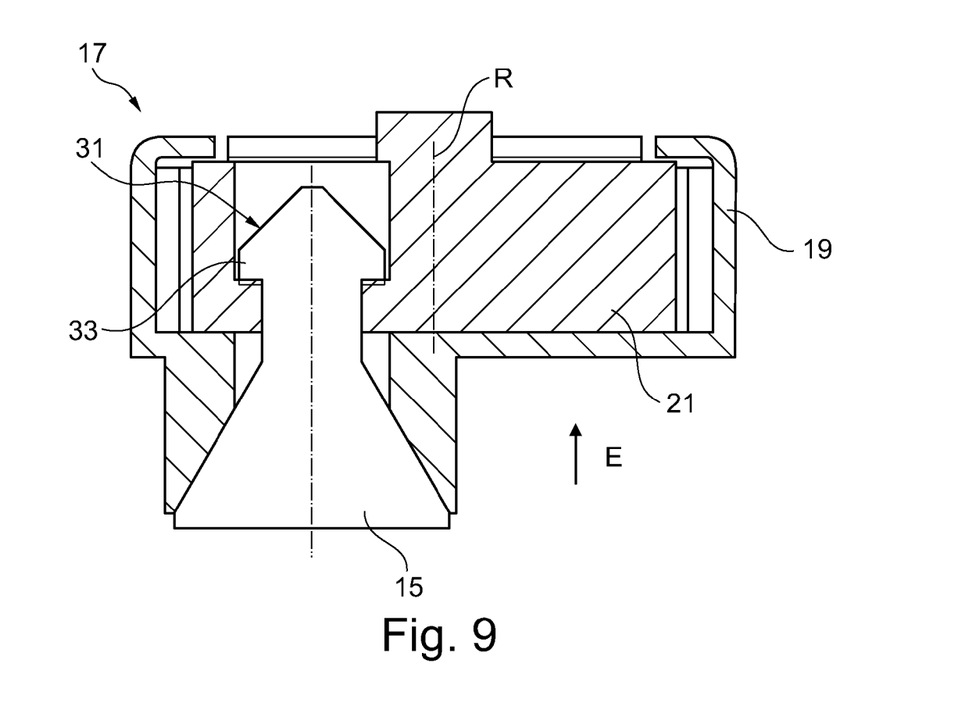
FIG. 9 illustrates the arrangement of FIG. 8, wherein the locking element is in the locked position.

As illustrated in FIGS. 7 and 8, the insertion bolt 15 is moved further in the insertion direction E until the centering surface 35 of the insertion bolt 15 comes to rest on the stop surface 29 of the cage 19. In this state, the conical surfaces 29, 35 lie against each other over their full surface. Then, for example, by means of a tool, the locking element 21 on the activation segment 27 is twisted or otherwise manipulated about rotation axis R, wherein the width of the passage opening 25 at the site of the insertion bolt 15 is reduced and the blocking surface 37 thus engages behind the retaining protrusion 33 of the insertion bolt 15. Because of the tilt of the blocking surface 37, the centering surface 35 of the insertion bolt 15 is thus tensioned against the stop surface 29 of the cage 19. The passage opening 25 with blocking surface 37 can then be structured such that a self-inhibiting effect results. If the locking element 21 has then reached the locked position illustrated in FIG. 9, the insertion bolt 15 is connected by form fit with the receiver unit 17 and secured against wobbling.

Figure 10:
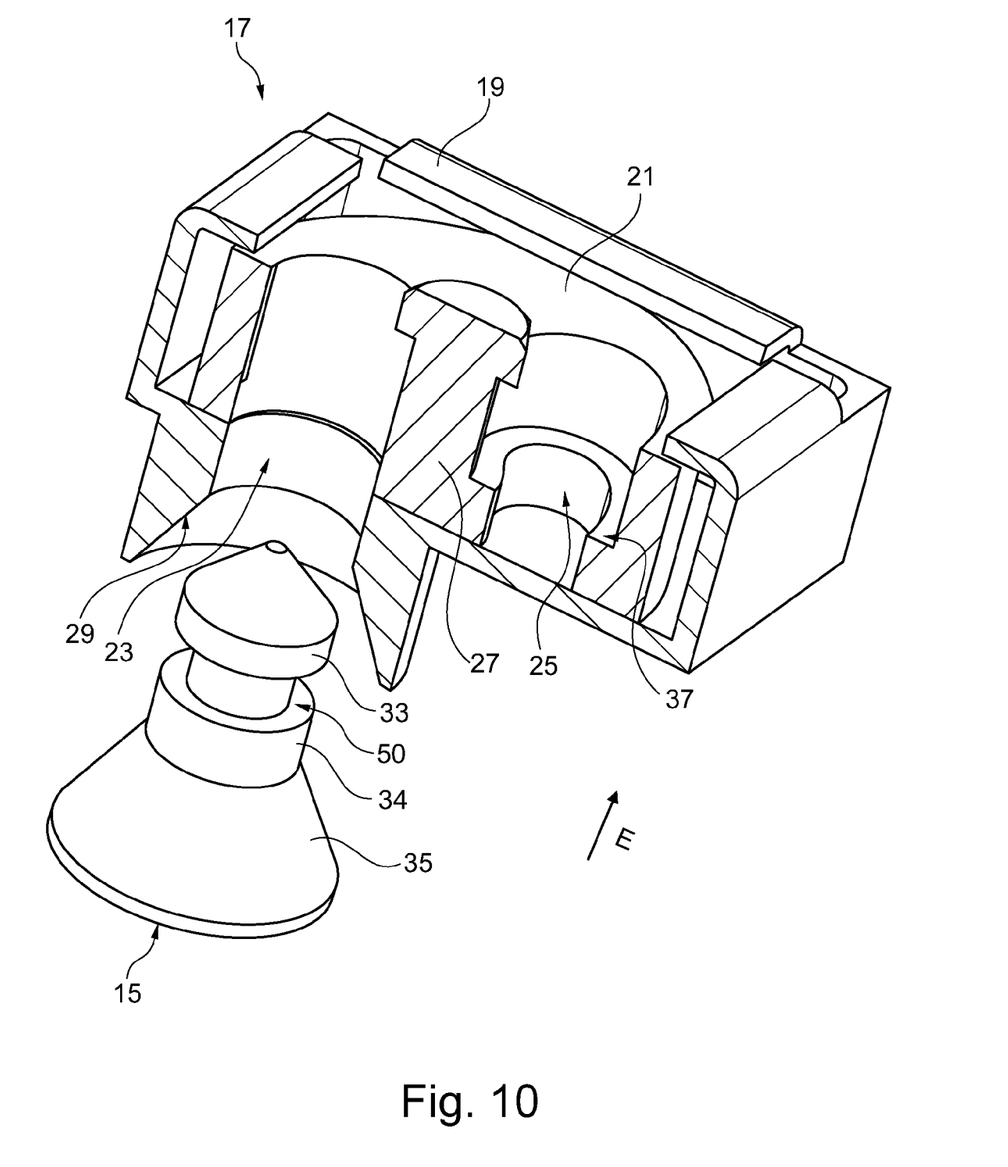
FIG. 10 illustrates a perspective, partly cut-away depiction of a fixing device in accordance with an alternative embodiment of the invention.

FIG. 10 illustrates a fixing device in accordance with an alternative embodiment of the invention in which the retaining protrusion 33 of the insertion bolt 15 is formed by a groove 50 provided in the cylindrical segment 34. In essence, the retaining protrusion 33 here does not protrude in relation to the cylindrical segment 34. Otherwise, the fixing device functions as in the arrangement illustrated in FIGS. 4 to 9, wherein to lock, the blocking surface 37 engages in the groove 50.

Figure 11:
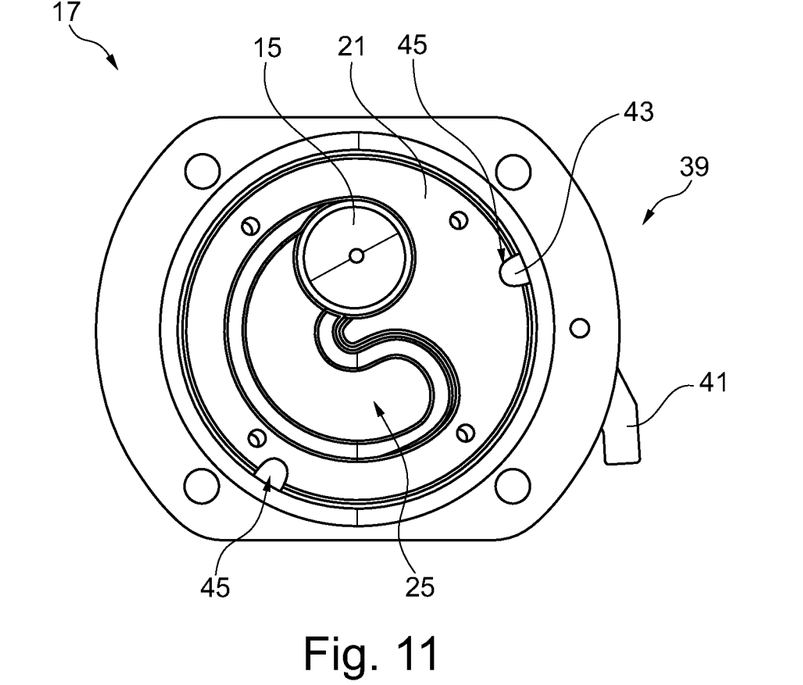
FIG. 11 illustrates a top view of the fixing device in accordance with embodiments of the invention which comprises a securing device.
Figure 12:
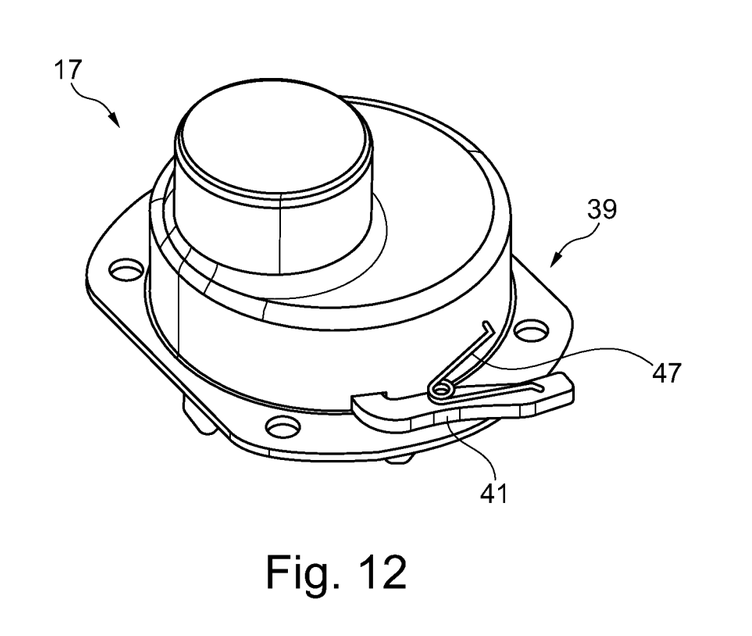
FIG. 12 illustrates a back view of a fixing device of FIG. 11.

In accordance with an embodiment illustrated in FIGS. 11 and 12, the receiver unit 17 comprises an additional securing device 39 in the form of a catch lever 41 mounted swivelably on the cage 19, on one end of which is provided a catch protrusion 43 which engages in one of two recesses 45 provided on the locking element 21. The two recesses 45 of the locking element 21 are arranged such that the locking element 21 can be engaged with the cage 19 by means of the catch lever 41 either in the release position or in the locked position. By pressing on the end of the catch lever 41 opposite the catch protrusion 43, the catch protrusion 43 can be moved out of the respective recess 45 and the catch thus released. A spring 47 illustrated in FIG. 11 pretensions the catch lever 41 in the engaged position.

Figure 13:
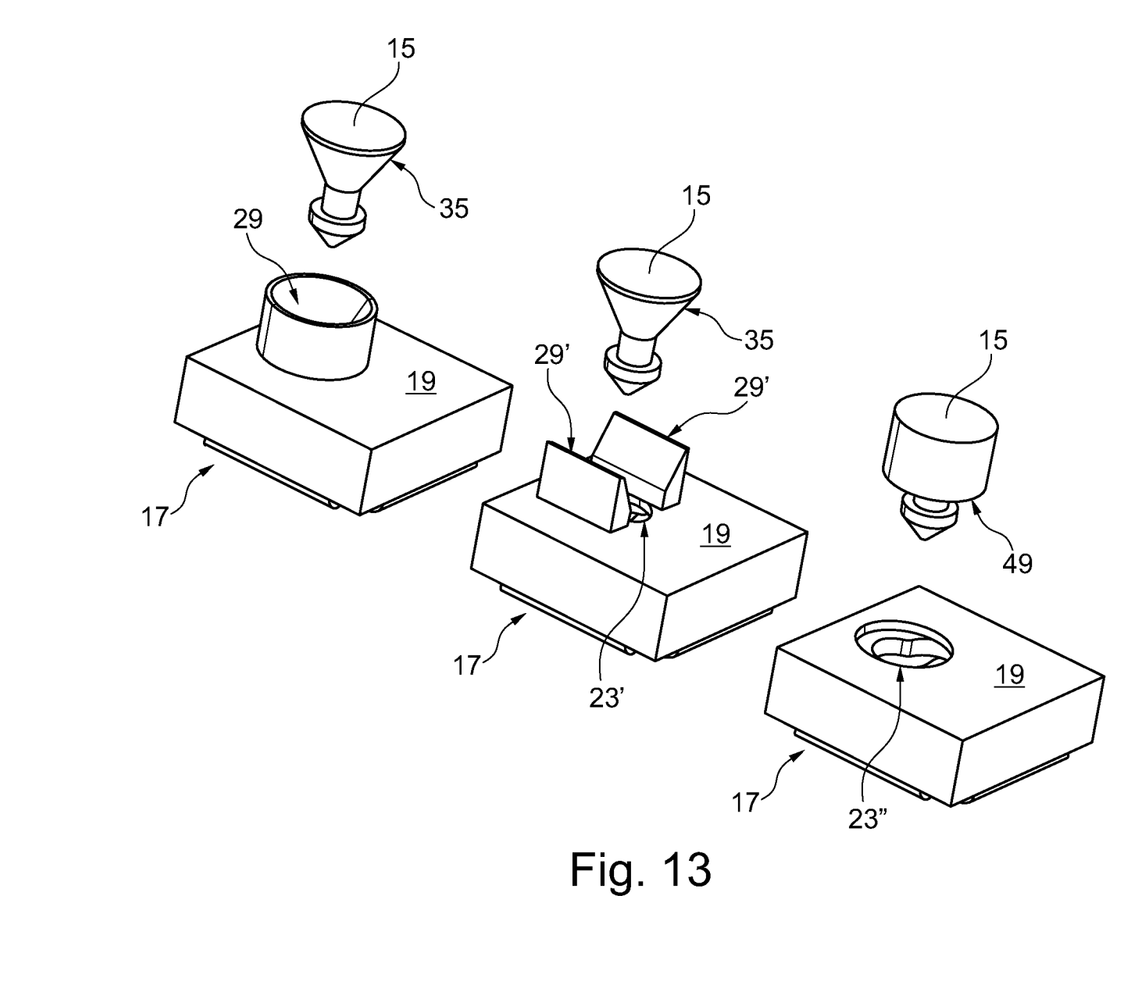
FIG. 13 illustrates various embodiments of fixing devices in accordance with embodiments of the invention which differ with regard to the form of a stop surface of the receiver unit and/or a form of a centering surface of the insertion bolt.
Figure 14:
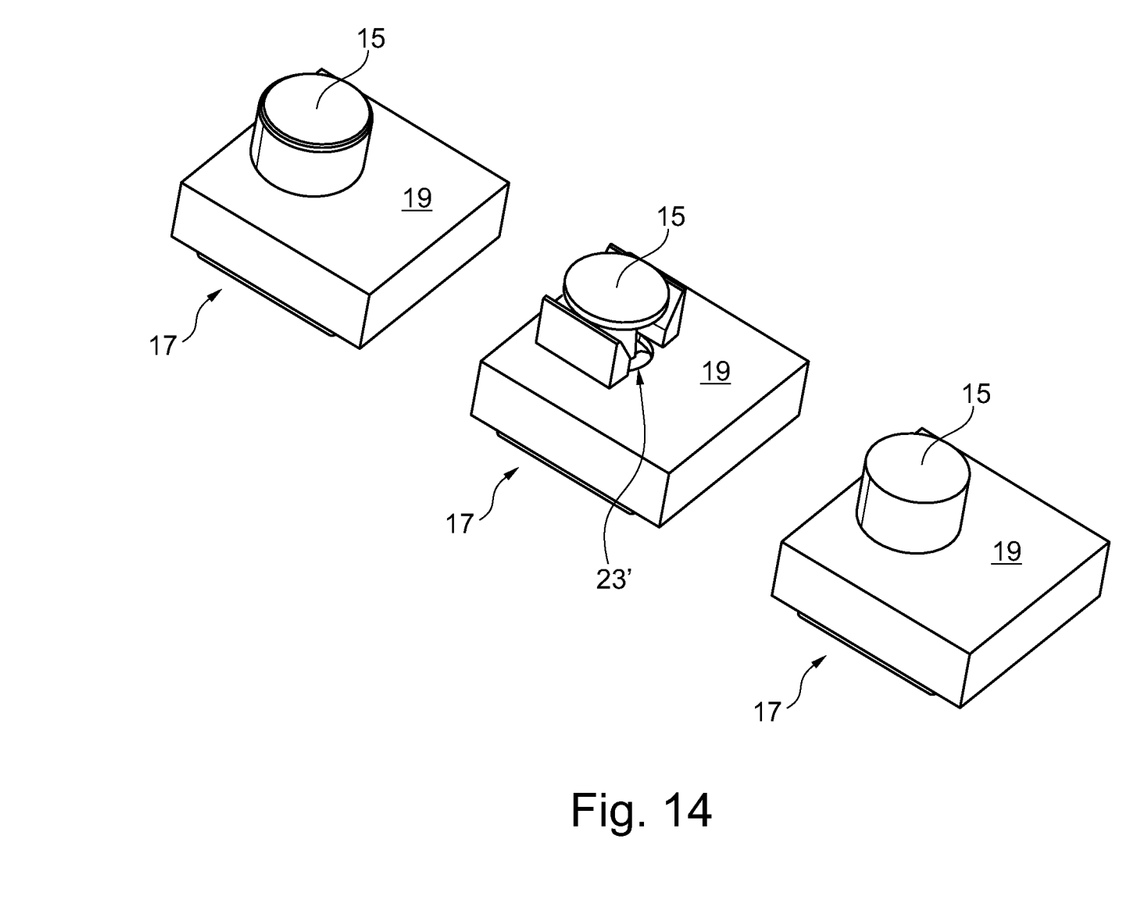
FIG. 14 illustrates the fixing devices of FIG. 13 in a locked state.

FIGS. 13 and 14 illustrate various variants of the fixing devices in accordance with the invention. FIG. 13 illustrates the respective insertion bolts 15 and receiver units 17 in separated state, whereas FIG. 14 illustrates the insertion bolts 15 in connection with the associated receiver units 17. The embodiment in the left-hand part of FIGS. 13 and 14 corresponds to the embodiments described above in connection with FIGS. 1 to 12, in which both the centering surface 35 of the retaining bolt 15 and the stop surface 29 of the cage 19 are conical. In this locking variant, precise centering is achieved in all spatial directions. In accordance with the embodiment illustrated in the middle part of FIGS. 13 and 14, the centering surface 35 of the insertion bolt 15 is also conical, the stop surface 29' of the cage 19, however, has two planar chamfer surfaces tilted relative to each other. In this embodiment, the insertion bolt 15 can be moved by a specific amount in a direction perpendicular to insertion direction E even after stopping on the stop surface 29', i.e., there is a degree of freedom of movement to compensate for tolerances. To allow the compensation movement, furthermore the insertion opening 23' of the cage 19 is formed as a slot. In the embodiment illustrated on the right-hand part of FIGS. 13 and 14, neither the insertion bolt 15 nor the receiver unit 17 have centering chamfer surfaces and the insertion opening 23" is enlarged in relation to the embodiments in FIGS. 1 to 12 so that the insertion bolt 15, after being fully introduced up to a planar stop 49, can be moved to all sides in a plane perpendicular to the insertion direction E.

By a combination of the variants illustrated in FIGS. 13 and 14, precise centering of the energy accumulator 13 on the associated carrying frame 11 can be achieved while avoiding over-determination of the system. For example, at one corner region of the energy accumulator 13 can be provided a fully centering fixing device in accordance with the left-hand part of FIGS. 13 and 14, while at the other three corner regions of the energy accumulator 13 only partly centering fixing devices are provided. Preferably, at one corner region a fixing device is provided with conical chamfer surfaces and at two further corner regions fixing devices with planar chamfer surfaces are provided, wherein the planar chamfer surfaces are oriented perpendicular to each other to create a possibility of centering in directions independent of each other.

As a whole, embodiments of the invention allows a releasable fixing of an electrical accumulator to a motor vehicle, wherein a change of energy accumulator can be carried out quickly and easily and repeated as often as required without excessive wear phenomena.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS

11 Carrying frame
12 Housing
13 Energy accumulator
14 Peripheral protrusion
15 Insertion bolt
17 Receiver unit
19 Cage
21 Locking element
23, 23', 23" Insertion opening
25 Passage opening
27 Activation segment
29, 29' Stop surface
31 Insertion chamfer
33 Retaining protrusion
34 Cylindrical segment
35 Centering surface
37 Blocking surface
39 Securing device
41 Catch lever
43 Catch protrusion
45 Recess
47 Spring
49 Planar stop
50 Groove
E Insertion direction
R Rotation axis

What is claimed is:

1. A fixing device for releasable fixing a rechargeable battery to a carrying structure of a motor vehicle, the fixing device comprising:
at least one insertion bolt including an insertion bolt body having a retaining protrusion; and
a receiver unit for the rechargeable battery and configured to receive the insertion bolt, the receiver unit including:
a receiver unit body having an insertion opening into which the insertion bolt body is introduced along an insertion direction; and
a locking element mounted in the receiver unit body for movement between a release position in which the locking element opens the insertion opening for introduction of the insertion bolt body, and a locked position in which engages behind the retaining protrusion of the insertion bolt body when the insertion bolt body is introduced into the insertion opening of the receiver unit body.

2. The fixing device of claim 1, wherein:
the insertion bolt body comprises at least one centering surface which is oriented obliquely relative to the insertion direction of the insertion bolt body;
the receiver unit body comprises at least one stop surface which is oriented obliquely relative to the insertion direction of the insertion bolt body; and
the centering surface of the insertion bolt body and the stop surface of the receiver unit body cooperate on introduction of the insertion bolt into the insertion opening such that the insertion bolt body and the receiver unit body are centered relative to each in at least one direction perpendicular to the insertion direction.

3. The fixing device of claim 2, wherein the centering surface of the insertion bolt body has a conical cross-section.

4. The fixing device of claim 2, further comprising an elastically deformable damping element provided on one of the centering surface of the insertion bolt body and on the stop surface of the receiver unit body.

5. The fixing device of claim 2, wherein:
the receiver unit body comprises a pair of stop surfaces which are tilted relative to each other; and
the insertion opening of the receiver unit body comprises a slot which extends parallel to the stop surfaces.

6. The fixing device of claim 1, wherein the locking element defines a passage opening with variable width.

7. The fixing device of claim 1, wherein the locking element is configured for manipulation about a rotation axis between the release position and the locked position.

8. The fixing device of claim 1, wherein the locking element is mounted in the receiver unit body with play such that the locking element is mobile in two dimensions relative to the receiver unit body in a plane running transverse to the insertion direction of the insertion bolt body.

9. The fixing device of claim 1, wherein:
the locking element comprises a blocking surface which engages behind the retaining protrusion of the insertion bolt body when the insertion bolt body is introduced into the insertion opening of the receiver unit body and the locking element is moved into the locked position; and
the blocking surface of the locking element is tilted at least in segments in relation to a plane normal to the insertion direction.

10. The fixing device of claim 1, wherein the receiver unit comprises a securing device configured to secure the locking element in at least one of the release position and the locked position by a respective catch closure.

11. The fixing device of claim 1, wherein a free end of the insertion bolt body comprises an insertion chamfer.

12. A system for releasably fixing a rechargeable battery to a motor vehicle, the device comprising:
a plurality of receiver units for the rechargeable battery, each one of the receiver units including:
a receiver unit body having an insertion opening into which the insertion bolt is introduced along an insertion direction; and
a locking element mounted in the receiver unit body for movement between a release position in which the locking element opens the insertion opening for introduction of the insertion bolt, and a locked position in which engages behind the retaining protrusion of the insertion bolt when the insertion bolt is introduced into the insertion opening of the receiver unit body;
an insertion bolt configured for receipt in a respective one of the receiver units, the insertion bolt including an insertion bolt body having a retaining protrusion.

13. The system of claim 12, wherein:
the receiver unit body of at least one of the receiver units comprises a stop surface which cooperates with a corresponding centering surface of a corresponding insertion bolt body such that the insertion bolt body and the receiver unit body are centered relative to each other in mutually perpendicular directions within a plane normal to the insertion direction;
the receiver unit body of at least one of the receiver units comprises at least one stop surface which is oriented obliquely to the insertion direction of a corresponding insertion bolt body and which cooperates with a centering surface of the insertion bolt body such that the insertion bolt body and the receiver unit body are centered relative to each other in a first direction perpendicular to the insertion direction;
the receiver unit body of at least one of the receiver units comprises at least one stop surface which is oriented obliquely to the insertion direction of a corresponding insertion bolt body and which cooperates with a centering surface of the insertion bolt body such that the insertion bolt and the receiver unit body are centered relative to each other in a second direction perpendicular to the insertion direction; and
the second direction being perpendicular to the first direction.

14. The system of claim 12, wherein the receiver unit body of at least one of the receiver units does not have a stop surface which is obliquely oriented to the insertion direction of a corresponding insertion bolt body.

15. The system of claim 12, wherein:
the receiver unit body of at least one of the receiver units does not have a stop surface which is obliquely oriented to the insertion direction of a corresponding insertion bolt body;
the receiver unit body of at least one of the receiver units comprises a stop surface which is obliquely oriented to the insertion direction of a corresponding insertion bolt body and which cooperates with a corresponding centering surface of a corresponding insertion bolt body such that the insertion bolt body and the receiver unit body are centered relative to each other in a first direction perpendicular to the insertion direction.

16. The system of claim 15, wherein:
the receiver unit body of at least one of the receiver units comprises at least one stop surface which is oriented obliquely to the insertion direction of a corresponding insertion bolt body and which cooperates with a centering surface of the insertion bolt body such that the insertion bolt and the receiver unit body are centered relative to each other in a second direction perpendicular to the insertion direction; and
the second direction is perpendicular to the first direction.

17. A vehicle comprising:
a carrying structure;
a rechargeable battery; and
a device for releasable fixing the rechargeable battery to the carrying structure, the device including:
at least one insertion bolt including an insertion bolt body having a retaining protrusion, wherein the insertion bolt body comprises at least one centering surface which is oriented obliquely relative to the insertion direction of the insertion bolt body; and a receiver unit for the rechargeable battery and configured to receive the insertion bolt, the receiver unit including a receiver unit body having an insertion opening into which the insertion bolt body is introduced along an insertion direction, and a locking element mounted in the receiver unit body for movement between a release position in which the locking element opens the insertion opening for introduction of the insertion bolt body, and a locked position in which engages behind the retaining protrusion of the insertion bolt body when the insertion bolt body is introduced into the insertion opening of the receiver unit body, wherein the receiver unit body comprises at least one stop surface which is oriented obliquely relative to the insertion direction of the insertion bolt body, and the centering surface of the insertion bolt body and the stop surface of the receiver unit body cooperate on introduction of the insertion bolt into the insertion opening such that the insertion bolt body and the receiver unit body are centered relative to each in at least one direction perpendicular to the insertion direction.

18. The vehicle of claim 17, wherein the vehicle comprises a hybrid vehicle.

19. The vehicle of claim 17, wherein the vehicle comprises an electric vehicle.

\* \* \* \* \*